June 21, 1938.   D. L. McNEAL   2,121,549

DIAPHRAGM VALVE

Filed Jan. 18, 1936

INVENTOR
DONALD L. McNEAL
BY Wm. M. Cady
ATTORNEY

Patented June 21, 1938

2,121,549

UNITED STATES PATENT OFFICE 2,121,549

DIAPHRAGM VALVE

Donald L. McNeal, Wilkinsburg, Pa., assignor to The Westinghouse Air Brake Company, Wilmerding, Pa., a corporation of Pennsylvania Application January 18, 1936, Serial No. 59,698

1 Claim. (Cl. 251—119)

This invention relates to valve structures, and more particularly to a diaphragm valve device adapted to control the flow of fluid under pressure.

In operating a diaphragm valve device of the type employing a flexible diaphragm having on one side a valve seat portion which is adapted to be urged into sealing engagement with a suitable seat for shutting off the flow of fluid under pressure, a considerable load or force must sometimes be applied to the back of the diaphragm in order to close the valve, as for instance, when said diaphragm is moved against an opposing fluid pressure. The force required for urging the valve against the seat may be so great as to cause undesirable distortion of the diaphragm and chafing or cutting of the valve seat portion, thereby preventing the tight seating action thereof.

The principal object of my invention is to provide an improved diaphragm valve structure having means for obviating the above difficulty.

Another object of my invention is to provide an inexpensive diaphragm valve structure having means for supporting the diaphragm independently of the valve seat portion, so as to prevent excessive displacement and possible cutting of said diaphragm when a heavy pressure is applied to the diaphragm for pressing said valve seat portion against the seat.

Figure 1:
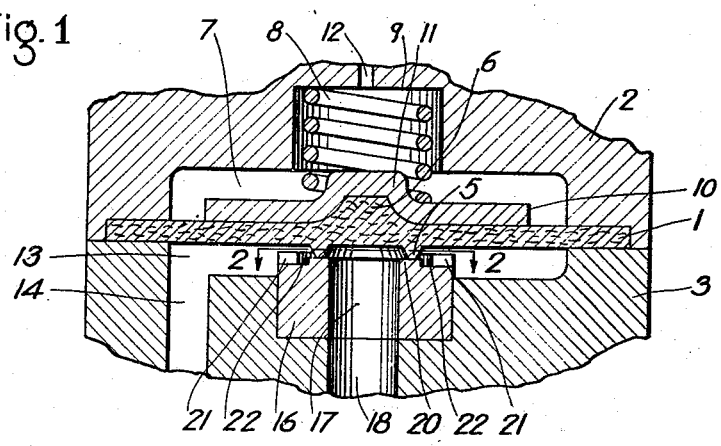
Figure 2:
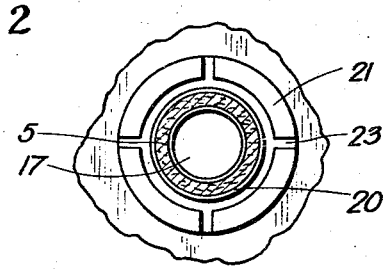

In the accompanying drawing, Fig. 1 is a sectional view of a diaphragm valve device embodying the invention, and Fig. 2 is a plan view taken on the line 2—2 of Fig. 1.

As shown in the drawing, the diaphragm valve device may comprise a flexible diaphragm 1 which is clamped between casing sections 2 and 3, said casing sections being secured together by any suitable means such as bolts (not shown). Disposed at the central portion of the diaphragm is an annular seating portion or bead 5 formed on one side of the diaphragm, and an enlarged boss portion 6 is formed on the side opposite said seat bead, so as to afford the desired degree of rigidity to the valve portion. Formed in the casing section 2 on one side of the diaphragm 1 is a chamber 7 containing biasing means for loading said diaphragm in the form of a coil spring 8, which extends into a recess formed in the wall 9 and is interposed between said wall and a follower member 10 which engages the diaphragm 1. The chamber 7 may be open to the atmosphere by way of a passage 12. The follower member has a recessed or dished portion 11 for receiving the boss portion 6 of the diaphragm 1, which is thus held against lateral movement relative to said follower member.

A valve chamber 13 is formed in the casing section 3 at the seating side of the diaphragm 1, said valve chamber being connected to a passage 14. Mounted in a countersunk bore in the casing section 3 is a valve seat member 16, which has a central opening connected to a passage 18 in said casing section. An annular seat rib 20 is provided on the seat member surrounding the opening 17, said seat rib being aligned for engagement with the annular seat bead 5 on the valve portion of the diaphragm 1.

According to my invention, diaphragm supporting shoulders 21 are provided on the seat member 16, said shoulders being formed as segments of an annulus surrounding the seat rib 20 and preferably projecting somewhat above the said seat rib. The space 22 intermediate the seat rib 20 and the shoulders 21 is always open to the valve chamber 13 by way of the radial grooves 23 separating said shoulders.

The spring 8 acts downwardly on the follower 10 and diaphragm 1 so as normally to urge the seat bead into engagement with the valve seat rib 20, cutting off communication between the valve chamber 13 and the passage 18. When fluid pressure acting in the chamber 13 is increased sufficiently to overcome the spring 8, the diaphragm 1 is moved upwardly, moving the seat bead 5 away from the seat rib 20 and permitting fluid under pressure to flow from said chamber through the opening 17 to the passage 18.

It will be apparent that if, when the pressure of fluid is reduced in chamber 13, the spring 8 should exert sufficient pressure to cause distortion of the seat bead 5, such distortion will be limited by the engagement of the shoulders 21 with the diaphragm.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

A diaphragm valve device comprising a casing, a flexible diaphragm mounted in the casing, said diaphragm having a centrally disposed boss portion formed on one side and an annular seat bead carried on the other side concentrically of said boss portion, a rigid follower member engaging said diaphragm and having a central recess for receiving said boss portion, an annular seat associated with said casing and engageable by the seat bead, and an annular, segmented shoulder surrounding the seat and disposed opposite a portion of the diaphragm outwardly of the boss portion, said segmented shoulder being spaced from said diaphragm upon initial engagement of the seat bead with said seat, and engageable by said diaphragm when the seat bead is distorted under pressure applied to said diaphragm through the medium of the follower member, whereby the pressure on said diaphragm is distributed for limiting the extent of distortion thereof in the region of the boss portion.

DONALD L. McNEAL.